US00RE44245E

(19) United States
(12) Reissued Patent
Callway et al.

(10) Patent Number: US RE44,245 E
(45) Date of Reissued Patent: May 28, 2013

(54) METHOD AND APPARATUS FOR DETECTING PROTECTION OF AUDIO AND VIDEO SIGNALS

(75) Inventors: Edward George Callway, Toronto (CA); Marinko Karanovic, Ontario (CA); Blair Birmingham, Toronto (CA)

(73) Assignee: ATI Technologies ULC, Markham, Ontario (CA)

(21) Appl. No.: 10/800,358

(22) Filed: Mar. 12, 2004

Related U.S. Patent Documents

Reissue of:
(64) Patent No.: 6,356,704
Issued: Mar. 12, 2002
Appl. No.: 08/878,249
Filed: Jun. 16, 1997

(51) Int. Cl.
*H04N 9/80* (2006.01)

(52) U.S. Cl.
USPC ..... 386/252; 380/203; 360/60; 386/253

(58) Field of Classification Search
USPC ..... 386/94, 124, 248, 252, 253; 380/203, 380/22, 201; 360/60
See application file for complete search history.

(56) References Cited

U.S. PATENT DOCUMENTS

| | | | | |
|---|---|---|---|---|
| 4,531,228 | A * | 7/1985 | Noso et al. | 704/275 |
| 4,593,384 | A * | 6/1986 | Kleijne | 365/228 |
| 4,819,098 | A * | 4/1989 | Ryan | 380/37.1 |
| 4,839,745 | A * | 6/1989 | Tindall | 358/336 |
| 4,914,694 | A | 4/1990 | Leonard et al. | |
| 4,945,563 | A * | 7/1990 | Horton et al. | 380/203 |
| 5,194,965 | A | 3/1993 | Quan et al. | |
| 5,231,546 | A | 7/1993 | Shimada | |
| 5,315,448 | A * | 5/1994 | Ryan | 360/60 |
| 5,319,705 | A | 6/1994 | Halter et al. | |
| 5,367,330 | A * | 11/1994 | Haave et al. | 348/7 |
| 5,418,853 | A * | 5/1995 | Kanota et al. | 380/5 |
| 5,510,900 | A * | 4/1996 | Shirochi et al. | 358/335 |
| 5,548,599 | A * | 8/1996 | Furuhashi et al. | 371/40.1 |
| 5,550,863 | A * | 8/1996 | Yurt et al. | 375/240 |
| 5,568,551 | A | 10/1996 | Kawashima | |
| 5,574,787 | A | 11/1996 | Ryan | |

(Continued)

FOREIGN PATENT DOCUMENTS

| | | |
|---|---|---|
| EP | 0574892 B1 | 12/1993 |
| EP | 0580367 B1 | 1/1994 |

(Continued)

OTHER PUBLICATIONS

European Search Report for Application EP 00304257.9-2002 (European Patent Office dated May 6, 2002).

(Continued)

*Primary Examiner* — Vincent Boccio
(74) *Attorney, Agent, or Firm* — Faegre Baker Daniels LLP

(57) ABSTRACT

A method and apparatus for protecting access to audio and/or video data is accomplished when data is received, where the data may be audio data and/or video data. Having received the data, it is interpreted to determine whether an embedded data access parameter is active. If so, an indication of the particular type of data access is generated. The data access parameter may control access to the data as at least one of: copy restrictions, viewing restrictions, and/or use restrictions. The indication is subsequently provided to a computer system such that unauthorized accessing, including unauthorized copying, of the video and/or audio data is prohibited.

21 Claims, 4 Drawing Sheets

U.S. PATENT DOCUMENTS 5,585,929 A 12/1996 Young et al.
5,599,231 A * 2/1997 Hibino et al. ..... 463/29
5,621,579 A * 4/1997 Yuen ..... 386/121
5,638,443 A 6/1997 Stefik et al.
5,694,381 A * 12/1997 Sako ..... 369/58
5,715,403 A * 2/1998 Stefik ..... 395/244
5,719,937 A * 2/1998 Warren et al. ..... 380/4
5,737,415 A * 4/1998 Akiyama et al. ..... 380/4
5,748,733 A * 5/1998 Quan ..... 380/15
5,764,964 A * 6/1998 Dwin et al. ..... 348/739
5,778,064 A * 7/1998 Kori et al. ..... 386/94
5,799,081 A * 8/1998 Kim et al. ..... 380/5
5,825,879 A 10/1998 Davis
5,844,615 A 12/1998 Nuber et al.
5,889,919 A 3/1999 Inoue et al.
5,982,977 A 11/1999 Naruse et al.
6,023,302 A 2/2000 MacInnis et al.
6,034,931 A 3/2000 Miwa et al.
6,256,390 B1 7/2001 Okuyama et al.
6,278,733 B1 8/2001 Bennett et al.
6,327,422 B1 12/2001 Quan et al.
6,330,393 B1 12/2001 Usui et al.
6,347,846 B1 2/2002 Nakamura
6,351,439 B1 2/2002 Miwa et al.
6,356,704 B1 * 3/2002 Callway et al. ..... 386/94
6,389,220 B2 5/2002 Usui et al.
6,437,830 B1 8/2002 Horlander
6,449,425 B1 9/2002 Ogino
6,473,560 B1 10/2002 Linnartz et al.
6,487,363 B1 11/2002 Ogino et al.
2001/0042043 A1 * 11/2001 Shear et al. ..... 705/51
2002/0034252 A1 3/2002 Owen et al.

FOREIGN PATENT DOCUMENTS

EP 0581227 A2 2/1994
EP 0814474 A1 12/1997
EP 0854648 A2 7/1998
EP 0942418 A1 9/1999
EP 0854648 A3 12/1999
WO WO95/15660 6/1995
WO WO97/43853 11/1997
WO WO98/16926 4/1998

OTHER PUBLICATIONS

European Search Report for Application EP 00307709.6 (European Patent Office dated Jun. 14, 2002); pp. 1-6.
Benson, TV eng. Handbook, pp. 5.1 to 5.13, Dec. 1986.*

* cited by examiner

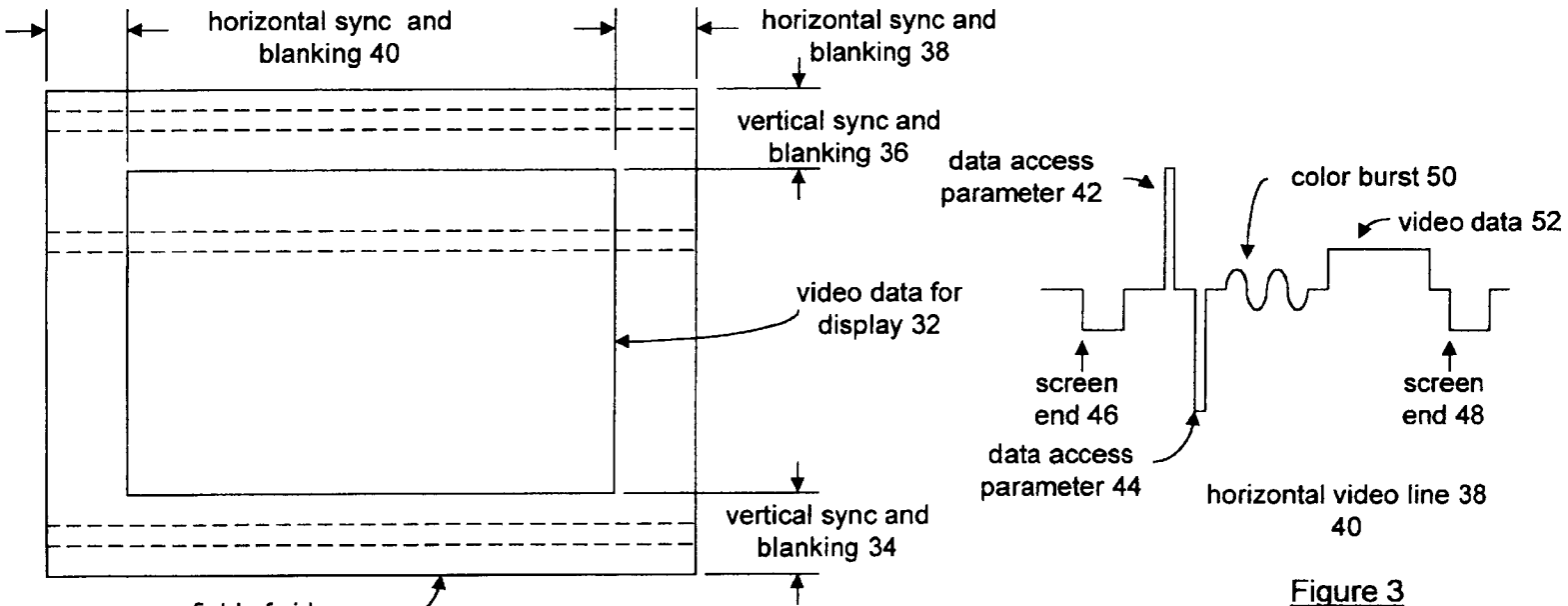
Figure 2
Figure 3
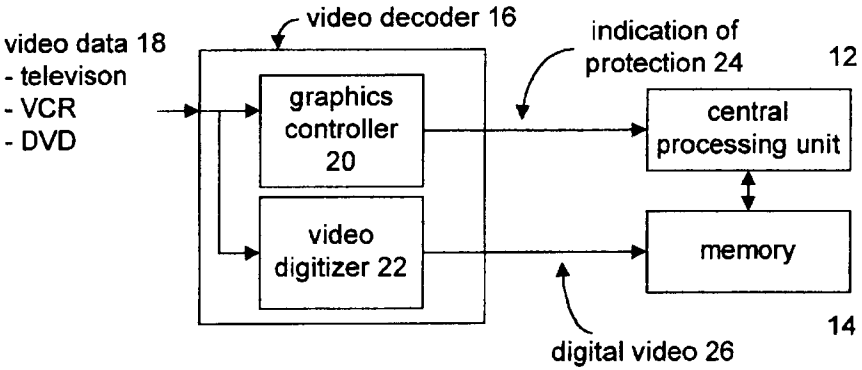
Figure 1

METHOD AND APPARATUS FOR DETECTING PROTECTION OF AUDIO AND VIDEO SIGNALS

Matter enclosed in heavy brackets [ ] appears in the original patent but forms no part of this reissue specification; matter printed in italics indicates the additions made by reissue.

TECHNICAL FIELD OF THE INVENTION

This invention relates generally to audio and/or video data and more particularly to copy protection of such audio and/or video data.

BACKGROUND OF THE INVENTION

Unauthorized copying of copyrighted works is, unfortunately, very prevalent in our society. Such unauthorized copying ranges from simple copying of a few pages from a copyrighted book to black market distribution of millions of dollars worth of illegally copied movies, compact discs, and other entertainment medium.

With the advent of DVD, the illegal copying of DVD's is of great concern to content companies (i.e., the companies owning the copyrighted work recorded on the DVDs). To protect the copyrighted works, content companies are demanding that DVD produces incorporate a security mechanism to prevent unauthorized copying. One such security mechanism is currently being used in conjunction with video cassette recorders and was developed by Macrovision.

The Macrovision anti-taping technique (herein after referred to as Macrovision) works due to the differences in the way VCRs and televisions operate. The automatic gain control (AGC) circuits within a television respond slowly to change, while a VCR's AGC respond quickly to change. Macrovision takes advantage of this difference by modifying the video signal so that a television will still play it properly, while a VCR will not record a viewable picture. Macrovision accomplishes this by utilizing at least one of Sync pulse adjustment, vertical blanking pulses, and end of field pulses. This technique is being contemplated as an adequate part of a solution for copy protection for DVDs.

While Macrovision prevents VCRs coupled to televisions from making quality copies, it does not prevent unauthorized copying when a VCR, or any other video source (including a DVD player), is coupled to a personal computers ("PC"). As is generally known, a PC may be equipped with an analog video decoder, such as the All-in-Wonder, manufactured by ATI Technologies, Inc., which converts an analog video signal into a digital video data stream, where the analog video stream originated from a video source, such as a DVD player. Such an analog to digital conversion strips out the Macrovision encoding. As such, a DVD player sourcing the analog video to the PC may have the copyrightable work copied without the Macrovision encoding. Such unauthorized copying is unacceptable to content companies.

Therefore, a need exists for a method and apparatus that detects the presence of encoded copy protection information embedded in a video data stream such that a PC cannot make quality copies of the video data.

BRIEF DESCRIPTION OF THE DRAWINGS

FIG. 1 illustrates a schematic block diagram of a circuit that detects embedded protection coding within an audio and/or video data stream, such a circuit is in accordance with the present invention;

FIG. 2 illustrates a graphical representation of a field of video data which is in accordance with the present invention;

FIG. 3 illustrates a typical horizontal video line which includes embedded protection coding in accordance with the present invention;

DETAILED DESCRIPTION OF THE DRAWINGS

Figure 4:
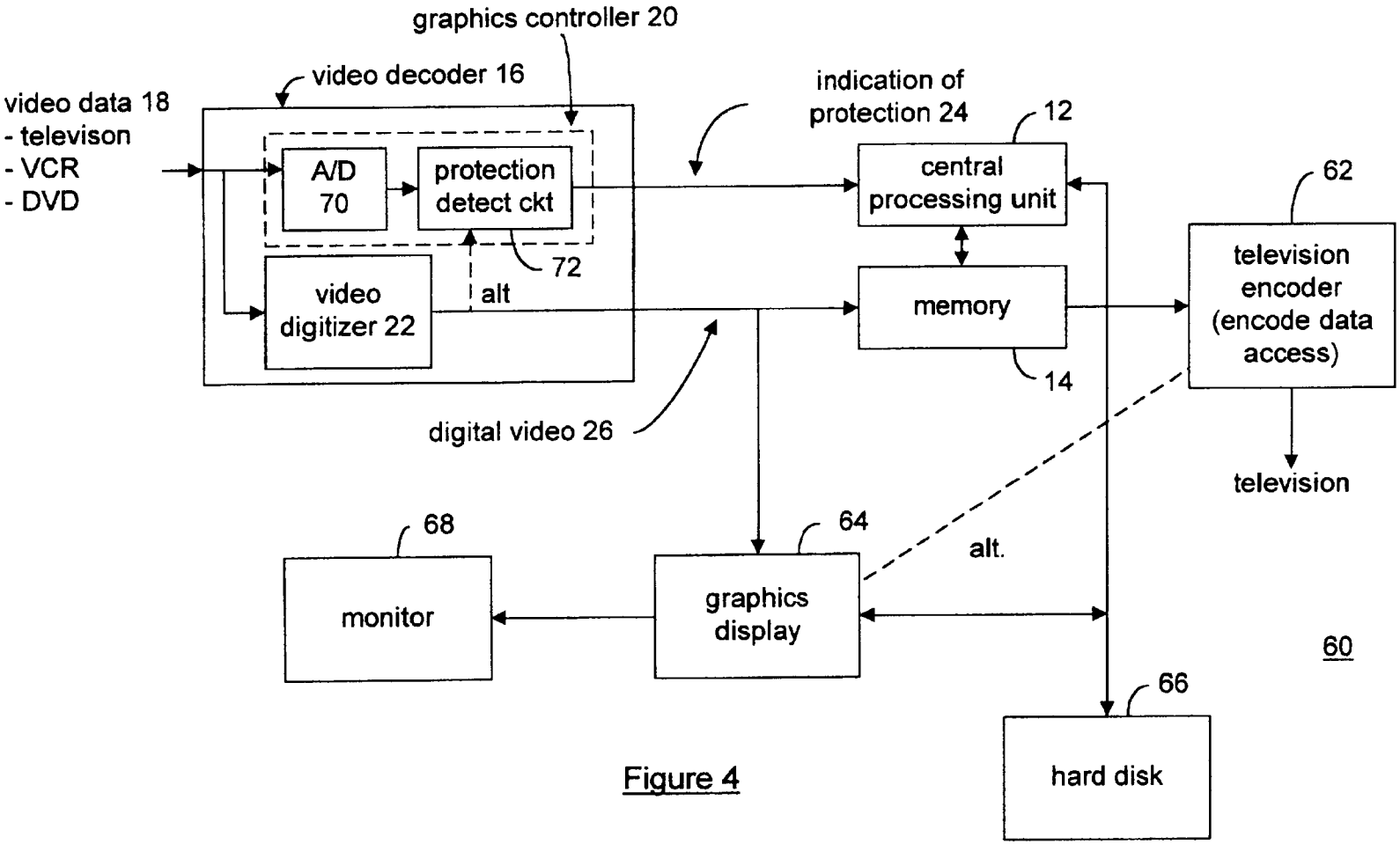
FIG. 4 illustrates a computer system that includes a embedded protection detecting circuit which is in accordance with the present invention.

Generally, the present invention provides a method and apparatus for protecting access to audio and/or video data. This may be accomplished when data is received, where the data may be audio data and/or video data. Having received the data, it is interpreted to determine whether an embedded data access parameter is active. If so, an indication of the particular type of data access is generated. The data access parameter may control access to the data as at least one of: copy restrictions, viewing restrictions, and/or use restrictions. The indication is subsequently provided to a computer system such that unauthorized accessing, including unauthorized copying, of the video and/or audio data is prohibited. With such a method and apparatus, a personal computer (PC) may be coupled to receive audio and/or video data from a data source, such as a DVD player, detect whether the data being sourced is protected, and, if so, ensure that the data is protected based on the data access parameter.

FIG. 1 illustrates a schematic block diagram of a computer system 10 that is equipped to detect the presence of embedded data access parameters in a data stream. The data stream may be representative of video data 18 or audio data which could be sourced by a television, VCR, DVD player, audio amplifier, etc. The computer system 10 is shown, in part, to include a central processing unit 12, memory 14, and a video decoder 16. The central processing unit 12 may be any type of central processing unit incorporated into a personal computer, such as those manufactured by Compaq, IBM, etc., a video game player, or a set-top entertainment PC. The memory 14 may be read only memory, random access memory, or cache memory.

The video decoder 16 includes a graphics controller 20 and a video digitizer 22. The video digitizer 22 receives the video data 18 and converts it into a digital video stream; as a by-product of the analog to digital conversion, the embedded protection coding that resides in the synchronization portions (i.e., horizontal and vertical sync) of the video data is lost. The resulting digital video data 26 is provided to the memory 14 for storage therein. As stored, the digital video data 26 does not include the embedded protection coding, such that, without the present invention, the digital video data 26 could be readily copied as directed by the central processing unit 12.

The graphics controller 20, however, prevents the central processing unit 12 from directing any such authorized access to the digital data by providing it with an indication of protection 24. The graphics controller 20 generates the indication of protection 24 by monitoring the video data 18 for the embedded protection coding. When detected, the graphics controller 20 provides the indication of protection to the central processing unit which is programmed to respond accordingly. The indication may be an indication that some form of protection is available (Eg. that the video data is encoded with Macrovision) or the indication may clearly define the particular type of protection. For example, the protection may be limited viewing options, parental control, copying restrictions, use restrictions of particular data, where the copy restrictions may be a limited time of copying, such as copying still frames, no copying, copying with copyright notices, and/or reduced quality copying. The central processing unit 12, upon receipt of the particular level of protection, ensures that the computer system 10 would handle the video data as indicated by the level of protection.

As a further function of the central processing unit 12, it may determine that the exact type of protection required cannot be processed by the CPU due to user requirements and/or service provider requirements such as generic data access, new licensing provisions, protection levels changes, new hardware which requires a higher level protection, and/or new revision levels. As such, the central processing unit may determine an alternate data access parameter based on at least one of user requirements and service provider requirements. For example, if the CPU received an indication of protection 24 that allows for still frame copying, but newly revised copy restrictions limited such copying, the CPU could default to a no-copying restriction. As one skilled in the art will readily appreciate, the alternate protection may be done in an almost endless variety of ways based on changes to the user and/or service provider requirements.

FIG. 2 illustrates a graphical representation of a field of video data 30. As is known in the art, video data is presented in a plurality of fields which are displayed at a given rate upon a television set. One such rate is 59.94 hertz, which is commonly used for North American television. Thus, the field of video data 30 is one particular field that would be displayed for approximately 1/60th of a second. The field of video data 30 includes vertical sync and blanking 34 and 36, horizontal sync and blanking 38 and 40, and video data for display 32. If the video data is to be encoded, the horizontal sync lines 38 and 40 and/or the vertical sync lines 36 and 34 would include the embedded data access parameters. For example, the vertical sync lines 34 and 36 may include embedded information that allows close caption to be employed on a television set. The vertical sync lines 34 and 36—also referred to as vertical blank intervals—may further store information that is referred to as teletext lines, which allow for additional information to be carried in the vertical sync lines 34 and 36, or Intercast™ lines which allow HTML documents to be embedded in the vertical sync lines 34 and 36, without disrupting the video data for display 32. The vertical sync lines 34 and 36 may also include the Macrovision embedded coding.

FIG. 3 illustrates a representation of a horizontal sync line 38 or 40 that includes data access parameters 42, 44; screen ends 46,.48; a color burst wave form 50, and video data for display 52. As shown, the data access parameters 42 and 44 are embedded in the wave form to indicate that the data being transmitted is to be copy protected. In addition, the color burst wave form 50, which is shown as a sinusoid, may have a 180 degree phase-shift to further provide an indication of copy protection. The video data 52 contains the actual video that is displayed. The screen ends 46 and 48 indicate the edge of the horizontal line 38 or 40. Note that the data access parameters 42 and 44 are shown as peaks which are similar to the peaks incorporated in the Macrovision technique. These data access parameters 42 and 44, however, may further include data access restrictions related to viewing options, parental control, and use restrictions of the particular data.

FIG. 4 illustrates a schematic block diagram of a computer system 60 that includes the video decoder 16, the central processing unit 12, the memory 14, a television encoder 62, a graphics display 64, a hard disk 66, and a monitor 68. The video decoder 16 is shown to include the graphics controller 20 and the video digitizer 22. The graphics controller 20 is further shown to include an analog to digital (A/D) converter 70 and a protection detection circuit 72. In essence, the A/D converter 70 converts the video data stream 18 into a digital signal while the protection detection circuit 72 looks for the data access parameter peaks 42 and 44. Upon detecting these peaks, the protection detect circuit 72 provides the indication of protection 24 to the CPU 12.

As an alternative embodiment of the video decoder 16, the analog to digital converter 70 maybe deleted and the output of the video digitizer 22, which typically functions as an analog to digital converter, would provide the digital signals to the protection detect circuit 72. In this configuration, the protection detect circuit 72 would look for the data access parameters 42 and 44 in the digital data and subsequently provide the indication of protection 24.

The digital video data 26 is provided to memory 14 and to the graphics display 64. In the embodiment shown, if the video data 18 is provided by a DVD player, the digital data stored in memory 14 does not included the Macrovision encoding, thus, when the memory provides the digital video data 26 to the television encoder 62, the television encoder 62, if not informed by the central processing unit of the Macrovision encoding, would process the digital video data 26 without such coding. As mentioned, when the video signal does not include the protection coding, it can be readily copied. Thus, the present invention, via the graphics controller 20, provides an indication that the central processing unit 12 which, in turn, notifies the television encoder 62 that the data is to be encoded. The television encoder 62, based on signals from the CPU, activate an encoding process such that the resulting television signals include the protection information. For example, the television encoder 62 could encode the video data with the Macrovision technique.

*The hard drive, memory, or other digital storage medium may include programming instructions that when read by a processing device, such as the video decoder 16 to carry out operations described herein.*

Figure 5:
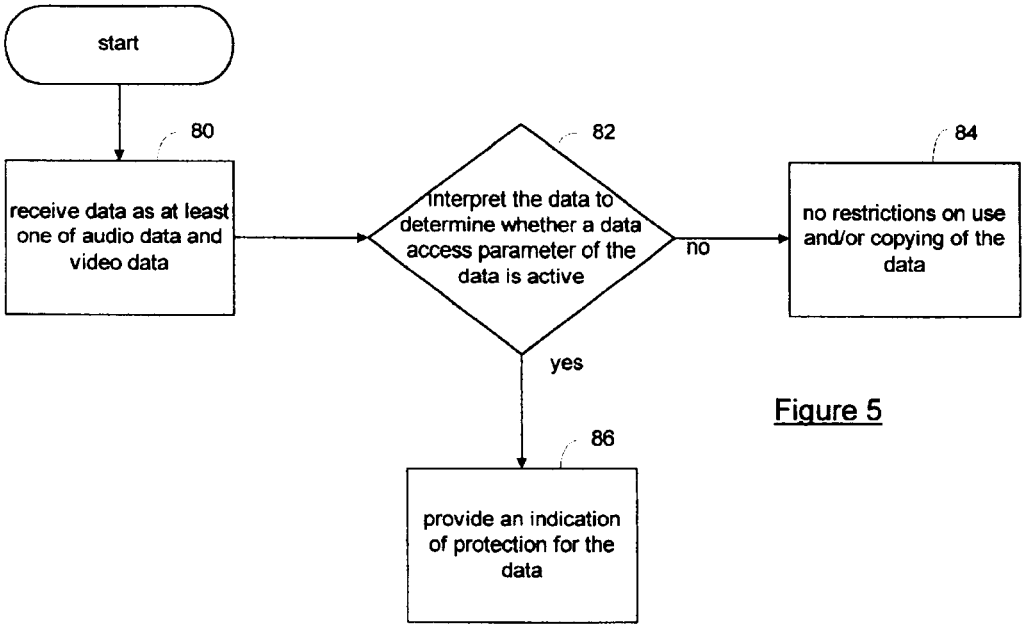
FIG. 5 illustrates a logic diagram that may be used to detect embedded protection information in accordance with the present invention.

FIG. 5 illustrates a logic diagram that may be used by the circuits of FIGS. 1 and 4 to detect whether a video and/or audio data stream includes data access protection parameters. The process begins at step 80 where data is received as audio data and/or video data. The process then proceeds to step 82 where a determination is made as to whether the data includes a data access parameter and whether the data access parameter is active. The data access parameter may indicate that the data has particular restrictions such as parental control, viewing options, copy restrictions and/or use restrictions. If the data access parameter is not active, the process proceeds to step 84 where no restrictions regarding use and/or copying are imposed on the data.

If, however, the data access parameter is active, the process proceeds to step 86 where an indication of protection regarding the data is provided. Such an indication is provided to the computer system such that the CPU and affiliated, peripheral devices, or computer elements, are prevented from copying and/or utilizing the data in an unauthorized manner.

Figure 6:
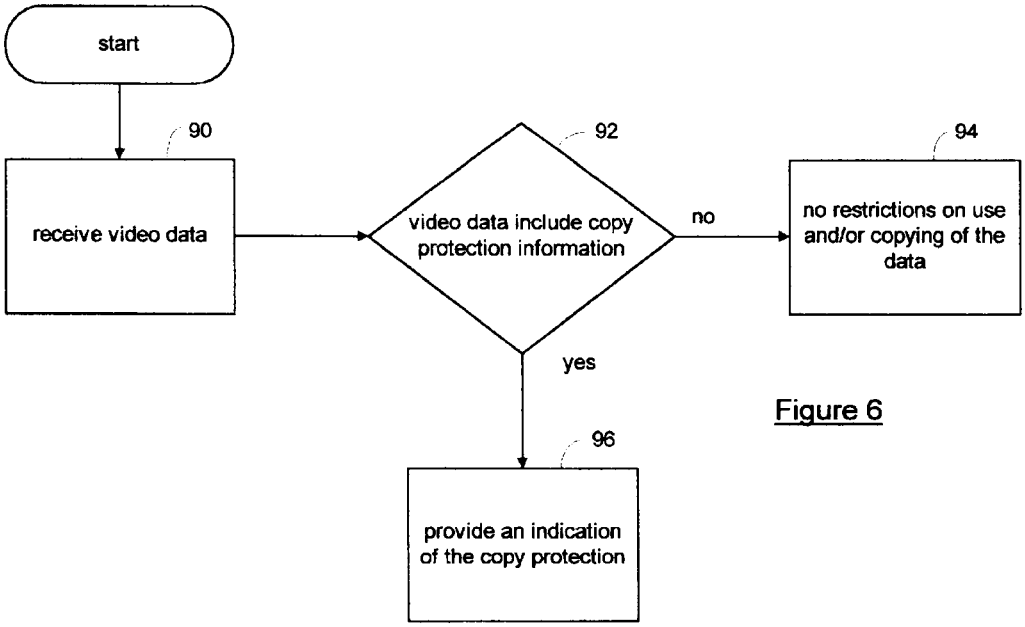
FIG. 6 illustrates a logic diagram that may be used to detect embedded copy protection coding in a video data stream in accordance with the present invention.

FIG. 6 illustrates a logic diagram that may be used to detect the presence of copy protection within a video data stream. The process begins at step 90 where a video data stream is received. Having received the data stream, the process proceeds to step 92 where a determination is made as to whether the video data stream includes copy protection information. If not, the process proceeds to step 94 where no restrictions are imposed on the copying and/or use of the data. If, however, the video data includes copy protection information, such as Macrovision, the process proceeds to step 96. At step 96, an indication of the copy protection, and the level of the copy protection, is provided. Such an indication is provided to the CPU of a computer as well as other computer elements.

Figure 7:
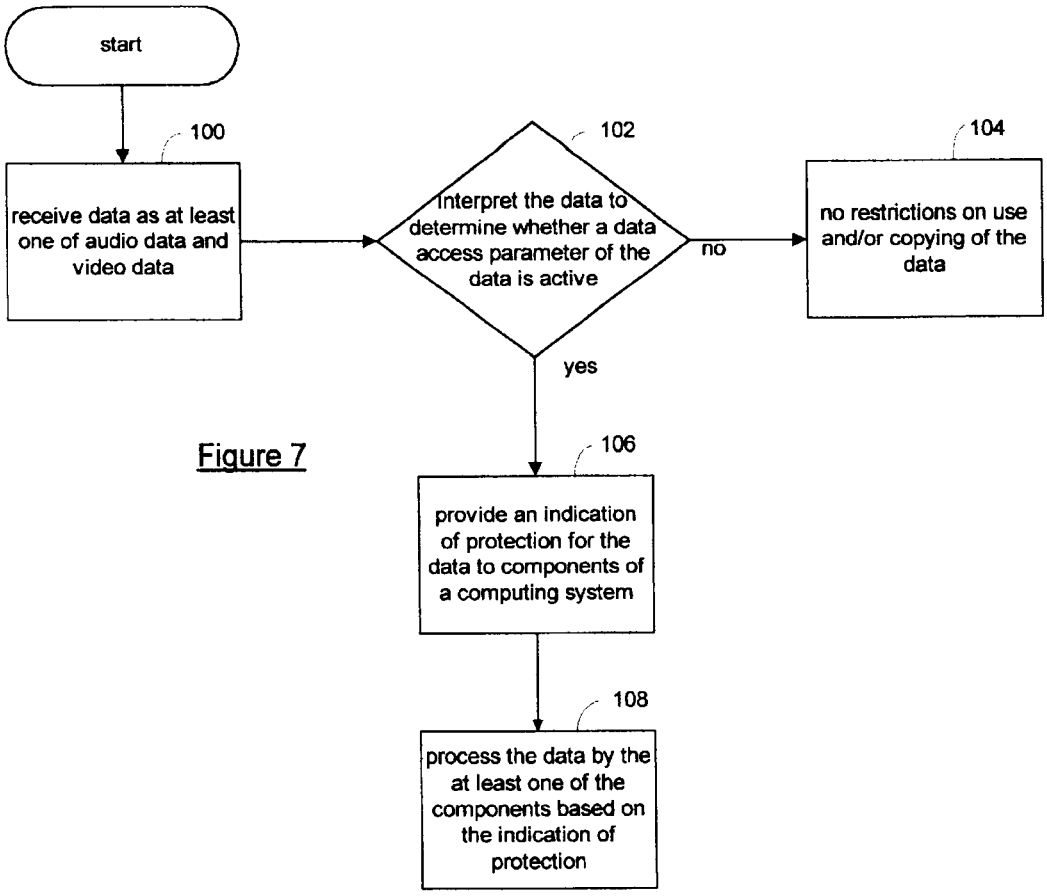
FIG. 7 illustrates a logic diagram that may be used to detect embedded protection information in a data stream in accordance with the present invention.

FIG. 7 illustrates a logic diagram that may be used to detect the presence of copy protection and/or use restrictions of a received data stream. The process begins at step 100 where data is received as audio and/or video data. Having received the data the process proceeds to step 102 where the data is interpreted to determine whether a data access parameter of the data is active. If not, the process proceeds to step 104 where no restrictions are imposed on the use and/or copying of the data.

If, however, the data access parameter is active, the process proceeds to step 106. At step 106, an indication of protection regarding the data is provided to components of a computer system. Having done this, the process proceeds to step 108 where the data is processed by at least one of the computer components based on the indication of protection.

The preceding discussion has presented a method and apparatus for detecting the presence of copy protection in a data stream. Upon detection of the protection information, the information is utilized by a computer system to prevent the unauthorized copying of copyrighted audio and/or video data. By the inclusion of the present invention in a computer system, it may receive video data from a DVD player and provide the level of protection the content providers are demanding.

What is claimed is:

1. A method for a computing system to provide protection of incoming data, the method comprising the steps of:

receiving, by a video decoder of the computing system, data of at least one of analog audio data and analog video data, wherein a line of the data includes screen end information, a data access parameter, color burst information, and at least one of audio and video data and wherein the data access parameter is independent of a source of the data;

digitizing, by the video decoder independent of the data access parameter, the at least one of audio and video data to produce digital video, wherein, once the at least one of audio and video data is digitized, the data access parameter is lost;

prior to enabling a central processing unit to access the digital video, determining by a graphics controller whether the data access parameter restricts accessing of the digital video; and when the data access parameter restricts accessing of the digital video, preventing the central processing unit from accessing the digital video without restriction.

2. The method of 1 further comprises, within step (a), receiving the date from at least one of: a digital video disc driver within the computing system, a video cassette recorder, and a video transmission source.

3. The method of claim 1, wherein the data access parameter comprises at least one of: copy restrictions and parental control.

4. A video decoder system comprising:

a processing circuit; and memory that stores programming instructions that, when read by the processing circuit, causes the processing circuit to:

cause a video decoder of a computing system to receive data of at least one of analog audio data and analog video data, wherein a line of the data includes screen end information, a data access parameter, color burst information, and at least one of audio and video data and wherein the data access parameter is independent of a source of the data;

digitizing, independent of the data access parameter, at least one of audio and video data to produce a digital signal, wherein once the at least one of audio and video data is digitized, the data access parameter is lost;

prior to enabling a central processing unit to access the digital signal, determine whether the data access parameter restricts accessing of the digital signal; and when the data access parameter restricts accessing of the digital signal, prevent the central processing unit from accessing the digital signal without restriction.

5. The video decoder of claim 14, wherein the memory further comprises programming instructions that, when read by the processing circuit, causes the processing circuit to receive the data from at least one of: a digital video disc driver within the computing system, a video cassette recorder, and a video transmission source.

6. The system of claim 4, wherein the accessing performed by the central processing unit further comprises copying the digital signal.

7. The system of claim 4, wherein the accessing performed by the central processing unit further comprises providing the digital signal to a display device.

8. The system of claim 4, wherein the digital signal further comprises audio and/or video data.

9. The system of claim 4, wherein the data access parameter includes copy restriction information.

10. A digital storage medium that stores programming instructions that, when read by a processing device, causes the processing device to detect protection of at least one of audio and video, the digital storage medium comprises:

first storage means for storing programming instructions that, when read by the processing device, causes the processing device to cause a video decoder of a computing system to receive data of at least one of analog audio data and analog video data, wherein a line of the data includes screen end information, a data access parameter, color burst information, and at least one of audio and video data and wherein the data access parameter is independent of a source of the data;

second storage means for storing programming instructions that, when read by the processing device, causes the processing device to digitize, independent of the data access parameter, the at least one of audio and video data to produce digital video, wherein, once the at least one of audio and video data is digitized, the data access parameter is lost;

third storage means for storing programming instructions that, when read by the processing device, causes the processing device to contemporaneous with the digitizing and prior to enabling a central processing unit to access the digital video, determine whether the data access parameter restricts accessing of the digital video; and fourth storage means for storing programming instructions that, when read by the processing device, causes the processing device to, when the data access parameter restricts accessing of the digital video, prevent the central processing unit from accessing the digital video without restriction.

*11. A method for a computing system to provide protection of incoming data, the method comprising:*

*receiving, by a video decoder, data of at least one of analog audio data and analog video data, wherein a line of the data includes screen end information, a data access parameter, color burst information, and at least one of audio and video data and wherein the data access parameter is independent of a source of the data;*

*digitizing, by the video decoder, independent of the data access parameter, at least one of audio and video data to produce digital video, wherein once the at least one of audio and video data is digitized, the data access parameter is lost;*

*prior to enabling a central processing unit to access the digital video, determine whether the data access parameter restricts accessing of the digital video;*

*when the data access parameter restricts accessing of the digital video, prevent the central processing unit from accessing the digital video without restriction; and*

*wherein the incoming data includes an embedded data access parameter and wherein the method includes storing the digital video in memory wherein the stored digital video in the memory does not include the embedded data access parameter.*

*12. The method of claim 11 wherein preventing the central processing unit from accessing the digital video without restriction includes controlling access to the digital video to provide at least one of: copy restriction, viewing restriction and use restriction of the digital video.*

*13. The method of claim 12 wherein providing at least one of: copy restriction, viewing restriction and use restriction of the digital video includes controlling access to the digital video to provide a viewing option, parental control, still frame copy restriction, copying with copyright notices, and reduced quality copying.*

*14. A computing system to provide protection of incoming data that includes an embedded data access parameter comprising:*

*a video digitizer circuit operative to receive data of at least one of analog audio data and analog video data, wherein a line of the data includes screen end information, a data access parameter, color burst information, and at least one of audio and video data and wherein the data access parameter is independent of a source of the data and the digitizer circuit is operative to digitize, independent of the data access parameter, at least one of audio and video data to produce digital video, wherein once the at least one of audio and video data is digitized, the data access parameter is lost;*

*memory operatively coupled to the video digitizer circuit, for storing the digital video wherein the stored video data does not include the data access parameter;*

*a protection detection circuit operative to detect the presence of the embedded data access parameter and provide an indication of protection based on the embedded data access parameter when the embedded data access parameter is detected wherein the indication of protection indicates one of a plurality of different types of data access; and*

*at least one of: a central processing unit and another computer element, responsive to the indication of protection from the protection detection circuit and operative to process the stored video data based on the indication of protection.*

*15. A method for a computer system to protect access to video data received from an analog video signal that includes an embedded data access parameter comprising:*

*digitizing, by a video decoder, the analog video signal to produce stored digital video wherein once the analog video signal is digitized, the embedded data access parameter is lost;*

*receiving, by a controller, an indication of data access restriction for stored digital video data that is stored in memory, based on the embedded data access parameter, wherein the stored digital video data was generated by the digitizing operation and does not include any embedded data access parameter from the analog video signal or any other data access parameter; and*

*processing the stored digital video data in accordance with the received indication of data access restriction.*

*16. The method of claim 15 wherein the indication of data access restriction indicates one of a plurality of different types of data access of the stored digital video data and wherein processing the stored digital video data in accordance with the received indication of data access restriction includes controlling access to the stored digital video data to provide at least one of: copy restriction, viewing restriction and use restriction of the digital video data.*

*17. The method of claim 16 wherein controlling to provide at least one of: copy restriction, viewing restriction and use restriction of the digital video includes controlling access to the stored digital video data to provide at least one of a viewing option, parental control, still frame copy restriction, copying with copyright notices, and reduced quality copying.*

*18. A computer system to protect access to video data received from an analog video signal that includes an embedded data access parameter comprising:*

*a video digitizer circuit operative to digitize, independent of the data access parameter, at least one of audio and video data to produce digital video, wherein once the at least one of audio and video data is digitized, the data access parameter is lost;*

*memory containing stored digital video data obtained from the analog video signal wherein the stored digital video data does not include the embedded data access parameter from the analog video signal or any other data access parameter; and*

*at least one of: a central processing unit, a computer element and a peripheral device, operatively coupled to the memory, and operative to receive an indication of data access restriction based on monitoring of the analog video signal, for stored digital video data that is stored in memory, based on the embedded data access parameter, and operative to process the stored digital video data in accordance with the received indication of data access restriction.*

*19. The computer system of claim 18 wherein the indication of data access restriction indicates one of a plurality of different types of data access of the stored digital video data and wherein the at least one of the CPU, computer element and peripheral device processes the stored digital video data in accordance with the received indication of data access restriction and includes controlling access to the stored digital video data to provide at least one of: copy restriction, viewing restriction and use restriction of the digital video data.*

*20. The computer system of claim 19 wherein the at least one of the CPU, computer element and peripheral device provides at least one of: copy restriction, viewing restriction and use restriction of the digital video by controlling access to the digital video data to provide at least one of a viewing option, parental control, still frame copy restriction, copying with copyright notices, and reduced quality copying.*

*21. A method for a computer system to protect access to video data received from an analog video signal that includes an embedded data access parameter comprising:*

*monitoring the analog video signal via a controller in a first processing path to obtain the embedded access parameter;*

*converting the analog video signal via a digitizer in a second processing path to produce digital video data wherein once the analog video signal is digitized, the digital video data does not include the embedded access parameter;*

*storing the digital video data that does not include the embedded access parameter; and*

*processing by a processor, the stored digital video data that does not include the embedded access parameter, in response to the obtained embedded access parameter obtained by the controller in the first processing path.*

* * * * *